(12) United States Patent
Tovar

(10) Patent No.: US 9,486,983 B2
(45) Date of Patent: Nov. 8, 2016

(54) LAMINAR COMPOSITE AND METHOD OF PRODUCING SAME

(76) Inventor: Mark Tovar, Virginia, MN (US)

( * ) Notice: Subject to any disclaimer, the term of this patent is extended or adjusted under 35 U.S.C. 154(b) by 640 days.

(21) Appl. No.: 13/480,330

(22) Filed: May 24, 2012

(65) Prior Publication Data

US 2012/0301711 A1   Nov. 29, 2012

Related U.S. Application Data

(60) Provisional application No. 61/490,594, filed on May 27, 2011, provisional application No. 61/535,344, filed on Sep. 15, 2011.

(51) Int. Cl.
| | |
|---|---|
| *B32B 27/12* | (2006.01) |
| *B32B 27/30* | (2006.01) |
| *B32B 9/02* | (2006.01) |
| *B32B 9/04* | (2006.01) |
| *B32B 37/00* | (2006.01) |
| *B32B 37/12* | (2006.01) |

(52) U.S. Cl.
CPC .......... *B32B 9/045* (2013.01); *B32B 9/02* (2013.01); *B32B 27/12* (2013.01); *B32B 27/30* (2013.01); *B32B 37/003* (2013.01); *B32B 37/1207* (2013.01); *B32B 2250/03* (2013.01); *B32B 2250/40* (2013.01); *B32B 2307/412* (2013.01); *B32B 2307/414* (2013.01); *B32B 2309/02* (2013.01); *B32B 2309/105* (2013.01); *B32B 2317/08* (2013.01); *B32B 2405/00* (2013.01); *B32B 2451/00* (2013.01); *B32B 2457/00* (2013.01); *Y10T 156/10* (2015.01); *Y10T 428/266* (2015.01); *Y10T 428/269* (2015.01)

(58) Field of Classification Search
None
See application file for complete search history.

(56) References Cited

U.S. PATENT DOCUMENTS

| | | | | |
|---|---|---|---|---|
| 4,147,826 A | * | 4/1979 | Kaleta | ........................... 428/151 |
| 2012/0251776 A1 | * | 10/2012 | Godfrey et al. | .............. 428/142 |

\* cited by examiner

*Primary Examiner* — Sheeba Ahmed
(74) *Attorney, Agent, or Firm* — Troutman Sanders LLP

(57) ABSTRACT

A laminar composite comprising a transparent or translucent cover layer, a base layer, and a layer of reptile shed sandwiched between the base layer and the cover layer. The base layer, cover layer and/or reptile shed are provided on one side with an adhesive, such as a heat-activatable adhesive, to bond the three layers together to form a flexible laminar composite.

19 Claims, 3 Drawing Sheets

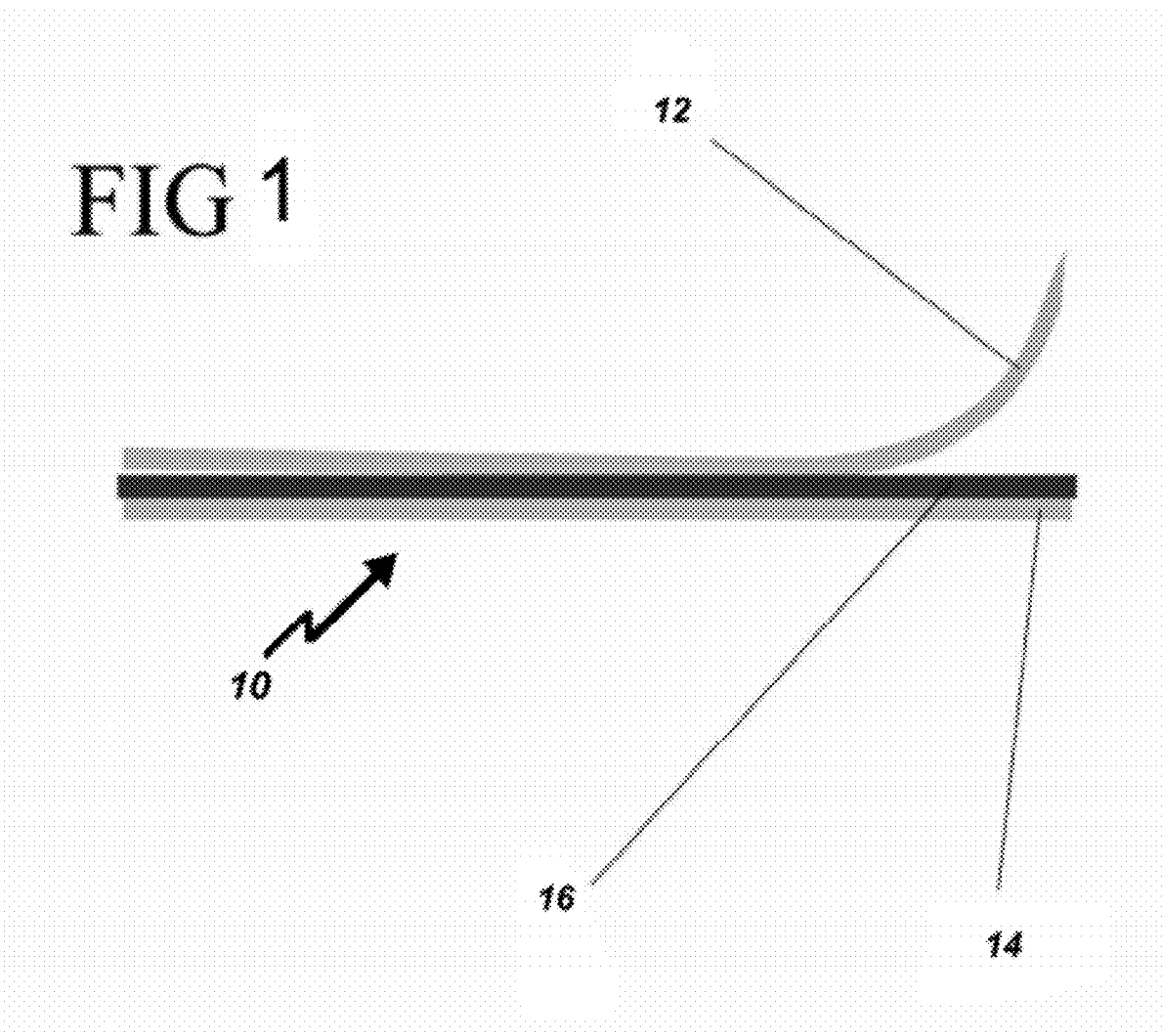

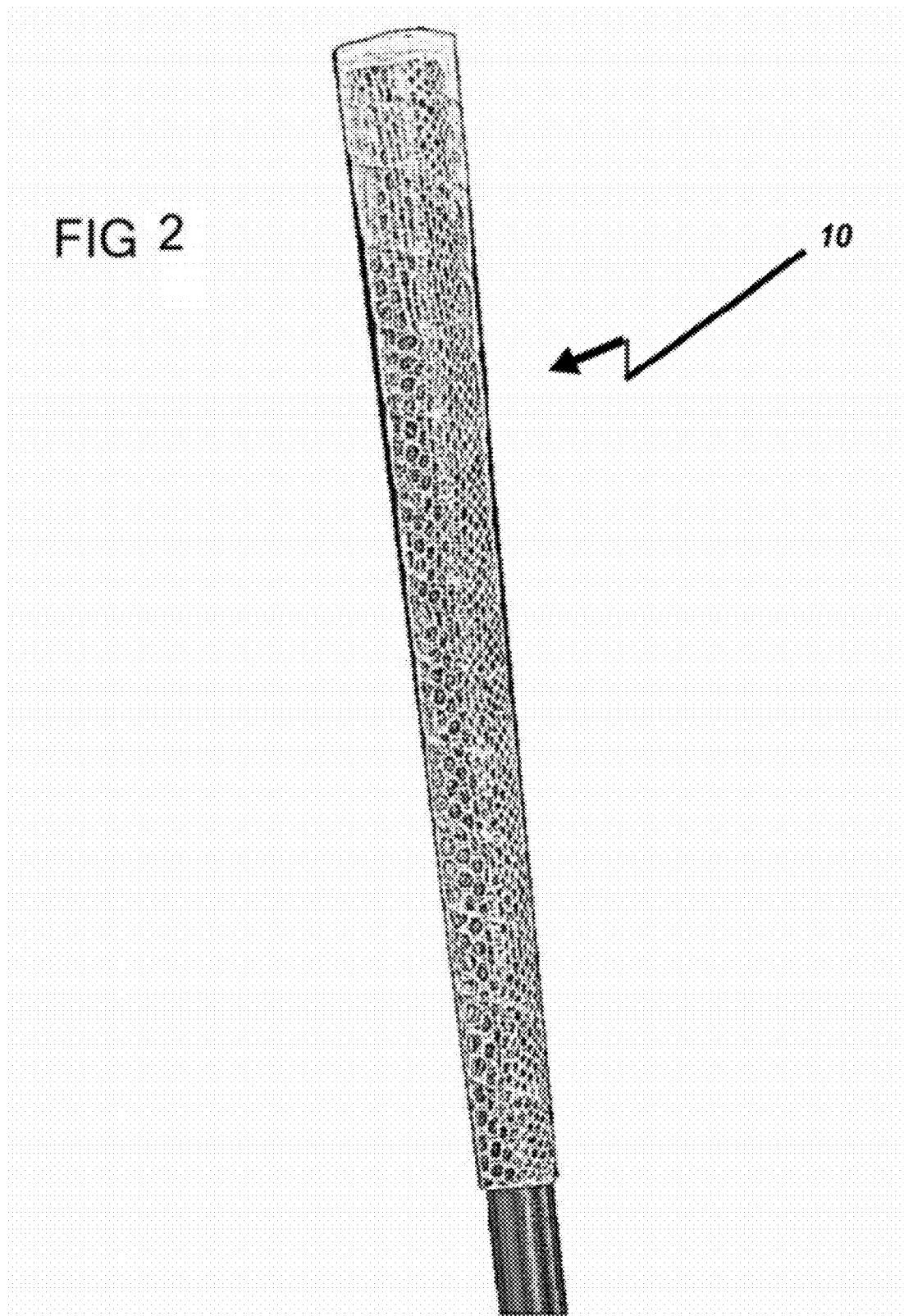

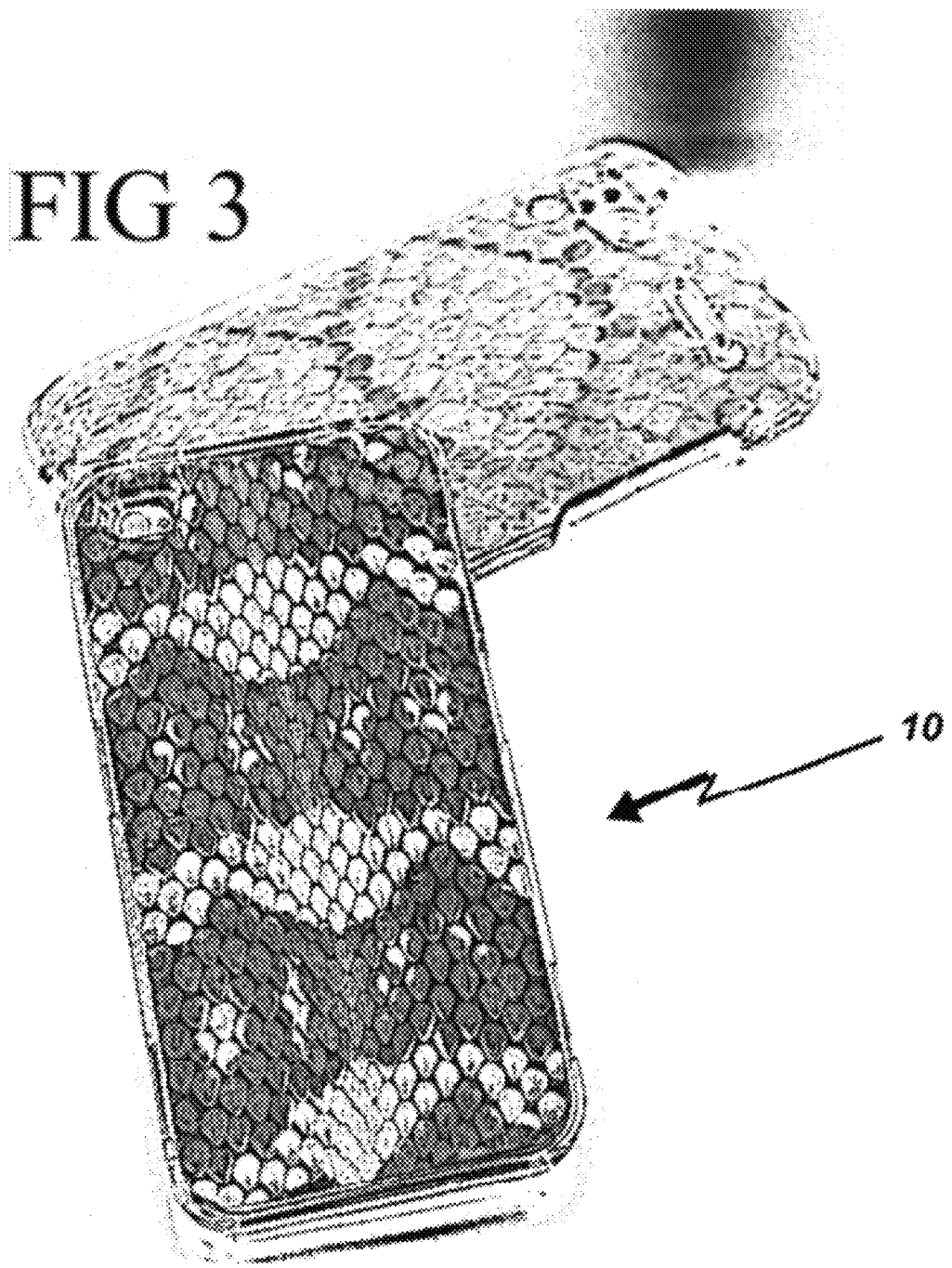

LAMINAR COMPOSITE AND METHOD OF PRODUCING SAME

The instant application should be granted the priority dates of May 27, 2011 the filing date of the U.S. provisional application 61/490,594 and Sep. 15, 2011, the filing date of provisional application 61/535,344.

BACKGROUND OF THE INVENTION

The present invention relates to a laminar composite, and to a method of producing such a laminar composite, for protecting a layer of reptile shed. Skin shed from a snake or other reptile is very fragile and brittle, and hence has a limited life.

It is therefore an object of the present invention to be able to preserve fragile or delicate reptile shed while providing a durable product.

BRIEF DESCRIPTION OF THE DRAWINGS

This object, and other objects and advantages of the present invention, will appear more clearly from the following specification in conjunction with the accompanying schematic drawings, in which:

FIG. 1 is a cross-sectional view showing the basic build-up of the laminar composite of the present invention;

FIG. 2 shows an exemplary use of the laminar composite of the present application; and FIG. 3: shows another exemplary application of the laminar composite of the present application.

SUMMARY OF THE INVENTION

The laminar composite of the present application comprises a transparent or translucent cover layer, preferably a vinyl material, a base layer, which can also be of vinyl or other polymeric material, and a layer of reptile shed sandwiched between the base layer and the cover layer, wherein all three layers are bonded together to form a flexible laminar composite, with the scale side of the reptile shed being visible through the cover layer.

The method of producing the laminar composite of the present application includes the steps of placing a cover layer onto a flat surface to provide an exposed side of the cover layer facing away from the flat surface; placing the scale side of a layer of reptile shed against the exposed side of the cover layer, with an adhesive type material being disposed between the reptile shed layer and the cover layer; and placing a base layer onto that side of the reptile shed layer that faces away from the cover layer such that the reptile shed layer is sandwiched between the cover layer and the base layer to form a layered composite, wherein an adhesive type material is disposed between the base layer and the reptile shed layer. The layered composite can be heated to bond the three layers together to form the laminar composite.

Further specific features of the present application will be described in detail subsequently.

DESCRIPTION OF SPECIFIC EMBODIMENTS

Referring now to the drawings in detail, the laminar composite of the present application is designated generally by the reference numeral 10. While FIG. 1 is a schematic cross-sectional view showing the basic construction of the laminar composite 10, FIGS. 2 and 3 show exemplary uses of the laminar composite product itself.

With regard to FIG. 1, shown are the three layers of the laminar composite 10. In particular, the reference numeral 12 indicates a transparent or translucent cover layer, the reference numeral 14 indicates a base layer, and the reference numeral 16 indicates a reptile shed, which is sandwiched between the cover layer 12 and the base layer 14.

The laminar composite 10 preserves the reptile shed 16 while providing a flexible and durable product that has numerous applications. By way of example only, the laminar composite 10 can be used as educational material, as well as a substitute for vinyl, leather and textile materials, for example as a covering for a cell phone or as a cell phone case, computer skins, covers for electronic products, purses, wallets, sunglasses, clothing, etc.

The transparent or translucent cover layer 12 is preferably comprised of a vinyl compound, including polymerized vinyl compounds. Examples of materials that can be used for the cover layer 12 includeTherm O Web Vinyl—Gloss, Therm O Web Vinyl—Matte, Heat N Bond Vinyl—Gloss, Heat N Bond Vinyl—Matte, Pellon Vinyl—Gloss, Lenderink Dribond, Clear-Coat Overlay DriFilm, Clear Vinyl, and the like.

Similarly, the base layer 14 is also comprised of a flexible material, including vinyl compounds. By way of example, suitable materials for the base layer 14 include Spectra Eco-Film, Spectra Flex, ThermoFlex Plus, ThermoFlex Plus, ThermoFlex Xtra, ThermoFlex Sport, Cad-Cut Sportfilm lite, Cad-Cut Premium Plus, Cad-Cut Neon, Cad-Cut Fashion Film, Cad-Cut Fashion Film Electric and Thermo-Flock.

Depending upon the use that is to be made of the final laminar composite product, the thickness of the cover layer 12 and base layer 14 can range from 0.010 mil up to 20 mil.

In order to bond the three layers 12, 14 and 16 together, an adhesive is first of all provided between the cover layer 12 and the reptile shed 16. Pursuant to one presently preferred embodiment, in this regard that side of the cover layer 12 that is to face the reptile shed 16 is provided with a heat-activated adhesive, which is to be activated in a manner to be described subsequently. The cover layer 12 can either be purchased with such a heat-activated adhesive already present on one side, or a heat activated adhesive could also be sprayed onto one side of the cover layer. Examples of heat-activated adhesives include Spray N Bond Fusible Adhesive and Heat N Bond Fusible Adhesive. An adhesive is also present between the base layer 14 and the reptile shed 16 to ensure bonding together of these layers upon subsequent heat treatment. In particular, that side of the base layer 14 that is to face the reptile shed 16 is either provided with a heat-activated adhesive when purchased, or such an adhesive can be sprayed onto one side of the base layer 14. Although heat-activated adhesives are convenient to use, it should be understood that the adhesive could be any other suitable strong yet flexible adhesive, especially between the base layer 14 and the reptile shed 16. A clear adhesive (i.e. one that will not yellow) must be used between the cover layer 12 and the reptile shed 16. The glue or adhesive can be applied in any suitable manner. Examples of further suitable adhesives include Pronty Clear Textile Adhesive, Plasti-dip (clear), Triple Thick, and the like.

The following describes one way of producing the laminar composite 10 of the present application.

EXAMPLE

In this example, the material that was to be used for the cover layer 12, here by way of example Pellon vinyl fuse, was purchased with an adhesive already provided on one side. Therefore, to start the process, the protective layer over the adhesive had first to be peeled off, exposing a tacky or sticky side of the material. The material was then placed onto a flat surface, with the sticky side facing up. The scale side of the reptile shed, here a gaboon viper shed, was then placed upon the sticky side of the cover layer 12, and was gently pressed against the cover layer. For the base layer, in this example a material with a heat-activatable sticky on one side was utilized, in particular Spectra Eco Film, a heat transfer vinyl, in this case a polyurethane based product. Again, the protective layer was first peeled off, and the sticky side of the material was then placed against, and pressed gently onto, the reptile shed 16 between the cover layer 12 and the base layer 14. To bond the three layers together, the layered materials were placed in a heat fusion machine and heated to a temperature that was specific for the materials being utilized; in this example, the layered materials were heated for 12 seconds at 305° F. The outer side of the base layer 14 was scraped to remove any air bubbles.

A laminar composite produced in this manner is then ready to be cut to any desired size for its intended use. For example, as shown in FIGS. 2 and 3, the laminar composite could be used to form a covering for a handle, or for a cell phone case. The laminar composite is also particularly suitable for making wallets, purses, and laptop skins. The laminar composite could be glued and/or sewn to an object, or a double-sided tape could be disposed between the laminar composite and the object to be covered thereby.

The specification incorporates by reference the disclosure of provisional application 61/490,594 filed May 27, 2011, as well as provisional application 61/535,344 filed Sep. 15, 2011.

The present invention is, of course, in no way restricted to the specific disclosure of the specification and drawings, but also encompasses any modifications within the scope of the appended claims.

What I claim is:

1. A laminar composite, comprising:
   a transparent or translucent cover layer;
   a base layer; and
   a reptile shed layer sandwiched between said base layer and said cover layer,
   wherein (i) a first layer of adhesive is disposed between, and bonds, the base layer and the reptile shed layer and (ii) a second layer of adhesive is disposed between, and bonds, the transparent or translucent cover layer and the reptile shed layer to form a laminar composite, and
   wherein a scale side of said reptile shed is visible through said cover layer.

2. A laminar composite according to claim 1, wherein said cover layer is a flexible vinyl material.

3. A laminar composite according to claim 2, wherein said cover layer has a thickness of from 0.010 mil to 20 mil.

4. A laminar composite according to claim 1, wherein said base layer is a polymeric material.

5. A laminar composite according to claim 4, wherein said base layer has a thickness from 0.010 mil to 20 mil.

6. A method of producing the laminar composite of claim 1, including the steps of:
   placing a cover layer onto a flat surface to provide an exposed side of said cover layer facing away from the flat surface;
   placing the scale side of the reptile shed layer against the exposed side of said cover layer, wherein a first layer of adhesive type material is disposed between said reptile shed layer and said cover layer; and
   placing a base layer onto that side of said reptile shed layer that faces away from said cover layer such that said reptile shed layer is sandwiched between said cover layer and said base layer to form a layered composite, wherein a second layer of adhesive type material is disposed between said base layer and said reptile shed layer.

7. A method according to claim 6, which includes the further step of heating the layered composite to bond the layers together to form the laminar composite.

8. A method according to claim 6, wherein said base layer is provided with a heat-activated material on one side to provide said adhesive type material between said base layer and said reptile shed layer.

9. A method according to claim 8, wherein said cover layer is provided with a heat-activated material on one side to provide said adhesive type material between said reptile shed layer and said cover layer.

10. A method according to claim 9, which includes the further step of heating the layered composite to bond the layers together to form the laminar composite.

11. A method according to claim 6, which includes the further step of spraying a heat-activated material onto either said reptile shed layer or said base layer to provide said adhesive type material between said base layer and said reptile shed layer.

12. A method according to claim 11, which includes the further step of spraying a heat-activated material onto either said reptile shed layer or said cover layer to provide said adhesive type material between said reptile shed layer and said cover layer.

13. A method according to claim 12, which includes the further step of heating the layered composite to bond the layers together to form the laminar composite.

14. A method according to claim 6, which includes the further step of applying an adhesive onto either said base layer or said reptile shed layer to provide said adhesive type material between said base layer and said reptile shed layer.

15. A method according to claim 6, which includes the further step of applying a clear adhesive onto either said reptile shed layer or said cover layer to provide said adhesive type material between said reptile shed layer and said cover layer.

16. The use of the laminar composite of claim 1, which includes the step of: cutting the laminar composite to size for use by itself or to use to produce another object.

17. The use of laminar composite of claim 1, which includes the step of:
   applying the laminar composite to an object with an adhesive or a double-sided tape, and/or sewing the laminar composite to an object.

18. A laminar composite according to claim 1, said cover layer and said shed layer presenting opposed surfaces; and wherein at least one of the first and second layers of adhesive comprises a heat-activated adhesive layer.

19. A laminar composite, comprising:
   a transparent or translucent cover layer;
   a base layer; and
   a reptile shed layer sandwiched between said base layer and said cover layer,
   wherein (i) a first layer of adhesive is disposed between, and bonds, the base layer and the reptile shed layer and (ii) a second layer of adhesive is disposed between, and bonds, the transparent or translucent cover layer and the reptile shed layer to form a laminar composite, and wherein a scale side of said reptile shed is visible through said cover layer and wherein at least one of the first and second layers of adhesive comprises a heat-activated adhesive layer.

* * * * *